United States Patent [19]

Blazek

[11] 4,195,396

[45] Apr. 1, 1980

[54] METHOD OF FORMING AN AIRFOIL WITH INNER AND OUTER SHROUD SECTIONS

[75] Inventor: William S. Blazek, Valley City, Ohio

[73] Assignee: TRW Inc., Cleveland, Ohio

[21] Appl. No.: 860,684

[22] Filed: Dec. 15, 1977

[51] Int. Cl.² .............................................. B21K 3/04
[52] U.S. Cl. ................................. 29/156.8 H; 164/60; 164/25; 164/129; 415/191; 415/208; 415/216
[58] Field of Search ..................... 164/23, 60, 129, 76, 164/270, DIG. 15, 127, 125, 25; 29/527.1, 156.8 H, 156.8 B, 527.5; 415/115, 116, DIG. 5, 191, 208, 216; 416/232–234

[56] References Cited

U.S. PATENT DOCUMENTS

| 3,166,295 | 1/1965 | Szewalski et al. | 29/156.8 H |
|---|---|---|---|
| 3,656,222 | 4/1972 | Jones | 29/156.8 B |
| 3,965,963 | 6/1976 | Phipps et al. | 164/60 |
| 3,981,344 | 9/1976 | Hayes et al. | 164/60 |

FOREIGN PATENT DOCUMENTS

84210  7/1957  Netherlands ..................... 29/156.8 B

Primary Examiner—Robert D. Baldwin
Assistant Examiner—K. Y. Lin

[57] ABSTRACT

An improved method of forming inner and outer sections of a shroud with an airfoil extending between them includes forming the airfoil and shrouds in sections. An upper or convex section of an airfoil is formed with a radially inner section of the shroud while a concave or lower section of the airfoil is formed with a radially outer section of the shroud. A free end portion of the convex or upper airfoil section is inserted into an opening formed in the outer shroud section while a free end portion of the concave or lower airfoil section is inserted into an opening formed in the inner shroud section. The free end portions of the airfoil sections are then connected with the shroud sections to form a complete airfoil and a portion of the inner and outer shroud sections. Although the convex or upper airfoil section is disclosed herein as being integrally formed with the inner shroud section and the concave or lower airfoil section is disclosed as being integrally formed with the outer shroud section, this relationship is a matter of choice and could be reversed if desired.

25 Claims, 12 Drawing Figures

METHOD OF FORMING AN AIRFOIL WITH INNER AND OUTER SHROUD SECTIONS

BACKGROUND OF THE INVENTION

This invention relates to a method of forming an airfoil in association with portions of inner and outer shrouds.

Airfoils have been formed in connection with inner and outer shrouds by forming wax pattern sections which are interconnected to form a pattern assembly. This pattern assembly includes circular inner and outer shroud sections which are interconnected by a plurality of airfoils. The pattern assembly is then dipped in a slurry of liquid ceramic mold material to coat the pattern assembly. The liquid ceramic mold material is dried and the pattern destroyed to form a mold having a cavity corresponding to the configuration of the wax pattern. The inner and outer shroud sections and the airfoils are then integrally formed by pouring molten metal into the mold cavity. This general method of forming airfoils in association with inner and outer shrouds is disclosed in U.S. Pat. No. 3,848,654 and in Canadian Patent No. 952,284.

It has been proposed to form a hollow airfoil in sections which are interconnected in the manner disclosed in U.S. Pat. No. 3,981,344. In addition, it has been proposed that airfoils could be formed in sections with internal bracing between the sections in the manner disclosed in U.S. Pat. Nos. 1,603,051; 2,451,099; and 3,827,661. However, the airfoils disclosed in these last mentioned patents are not formed with shrouds.

SUMMARY OF THE PRESENT INVENTION

The present invention provides a method of forming inner and outer shroud sections with an airfoil extending between them. A first section of the airfoil is formed with a section of the inner shroud. A second airfoil section is formed with a section of the outer shroud. The two airfoil sections are then interconnected to complete the airfoil and to interconnect the inner and outer shroud sections.

To facilitate interconnecting the airfoil and shroud sections, each of the shroud sections is formed with an opening adjacent to a base of the associated airfoil section. A free end of the other airfoil section is inserted into the opening and connected with the shroud section.

By forming the inner and outer shroud sections separately from each other, casting of the shroud sections is facilitated. When the inner and outer shroud sections are cast in association with a single airfoil, the mold must have a down pour pole with two runners, that is a runner for each of the two shroud sections. When the metal in the down pour cools, it contracts to a greater extent than the relatively thin airfoil with the resulting application of stresses to the airfoil. By casting a single shroud section in association with an airfoil section, the stress applied to the airfoil section when the metal cools is reduced.

It is believed that the present method of forming the airfoil and shroud sections will be particularly advantageous when it is desired to provide a hollow airfoil with cooling tubes. The cooling tubes can be connected to the airfoil sections before they are interconnected to thereby facilitate attachment of the cooling tubes to the inside surfaces of the airfoil sections. In one embodiment of the invention, attachment of the cooling tubes to the inner surfaces of the airfoil sections is expedited by forming a portion of both the inner and outer shroud in association with each of the airfoil sections.

Accordingly, it is an object of this invention to provide a new and improved method of forming inner and outer shroud sections with an airfoil extending between them and wherein the method includes forming a first airfoil section and an inner shroud section, forming a second airfoil section and an outer shroud section, connecting a free end portion of the first airfoil section to the outer shroud section and connecting a free end portion of the second airfoil section to the inner shroud section.

Another object of this invention is to provide a new and improved method as set forth in the next preceding object and wherein the free end portions of the airfoil sections are connected with the shroud sections by inserting the free end portions of the airfoil sections into openings formed in the shroud sections.

Another object of this invention is to provide a new and improved method as set forth in any of the preceding objects and wherein a single airfoil section and a single shroud section are formed in a mold cavity in which a single runner conducts molten metal from a main passage.

Another object of this invention is to provide a new and improved method of forming inner and outer shroud sections with an airfoil extending between them and wherein a first section of the airfoil and portions of the inner and outer shroud sections are formed as one part and a second section of the airfoil and portions of the inner and outer shroud sections are formed as another part, the two parts being subsequently interconnected.

Another object of this invention is to provide close dimensional control of the throat opening, i.e., the space between the inner and outer shrouds.

BRIEF DESCRIPTION OF THE DRAWINGS

The foregoing and other objects and features of the present invention will become more apparent upon a consideration of the following description taken in connection with the accompanying drawings wherein.

DESCRIPTION OF SPECIFIC PREFERRED EMBODIMENTS OF THE INVENTION

A metal vane ring portion 20 constructed in accordance with the present invention includes a hollow airfoil 22 which extends between a section 24 of an outer shroud ring and a section 26 of an inner shroud ring. Only a portion 20 of a vane ring has been shown in FIG. 1. A plurality of similar vane ring portions are interconnected by welding, brazing or other means to form an annulus containing a plurality of airfoils 22.

Figure 1:
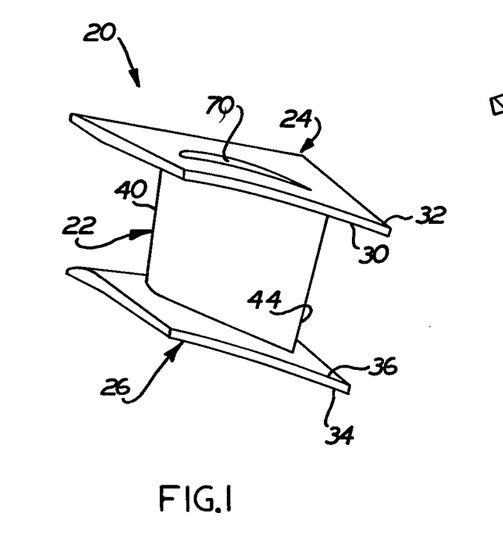
FIG. 1 is an illustration depicting inner and outer shroud sections with an airfoil extending between the shroud sections.

Since the vane ring portion 20 is one of many parts of a circular ring structure, the outer shroud section 24 is arcuately curving with parallel major inner and outer side surfaces 30 and 32 which have a common center, that is the center of rotation of the annular vane ring assembly. Similarly, the inner shroud section 26 has arcuately curving inner and outer major side surfaces 34 and 36 which have the same center as the side surfaces of the outer shroud section 24.

The airfoil 22 has a leading edge portion 40 which extends between the major side surfaces 30 and 36 of the outer and inner shroud sections 24 and 26. The airfoil 22 also has a trailing edge portion 44 which extends generally parallel to the leading edge portion 40 and also extends between the major side surfaces 30 and 36 of the inner and outer shroud sections 24 and 26.

In accordance with a feature of the present invention, the vane ring portion 20 is formed by two interconnected parts. Thus, the vane ring portion 20 includes radially inner and outer parts 48 and 50 (see FIG. 2). The outer part 48 includes the radially outer shroud section 24 and a concave airfoil section 54. Similarly, the inner part 50 includes the radially inner shroud section 26 and a convex airfoil section 56. Although the concave airfoil section 54 which forms the lower side surface of the airfoil 22 has been shown as being integrally formed with the outer shroud section 24 and the convex airfoil section 56 which forms the upper side of the airfoil 22 has been shown as being integrally formed with the inner shroud section 26, it is contemplated that the inner shroud section could be formed with the concave airfoil section and that the outer shroud section could be formed with the convex airfoil section.

Figure 3:
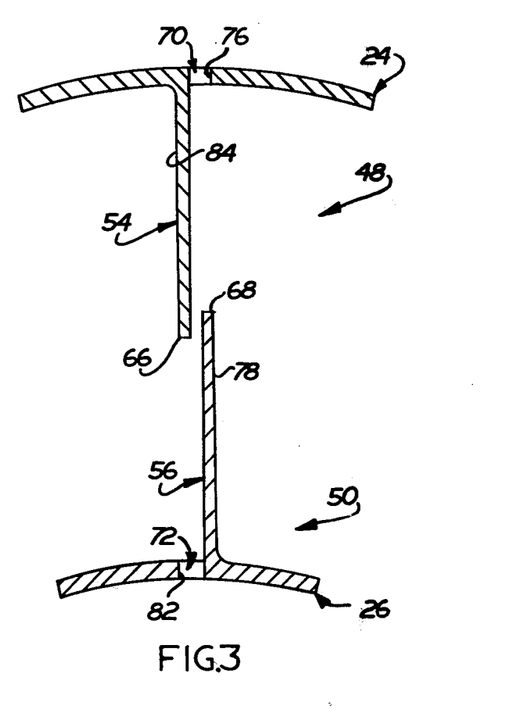
FIG. 3 is a sectional view illustrating the manner in which the airfoil sections are aligned with openings in the shroud sections.
Figure 4:
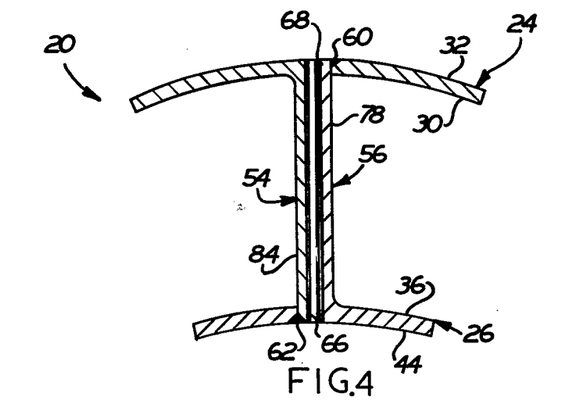
FIG. 4 is a sectional view, generally similar to FIG. 3, illustrating the airfoil and shroud sections in an interconnected condition.

The two parts 48 and 50 are interconnected to form the vane ring portion 20 in the manner illustrated in FIGS. 3 and 4. Thus, the two airfoil sections 54 and 56 are located sideways adjacent to each other in the manner shown in FIG. 3 and are then moved axially to the position shown in FIG. 4. The two airfoil sections 54 and 56 are connected with the inner and outer shroud sections 24 and 26 at suitable welds 60 and 62.

In order to facilitate interconnecting the airfoil sections 54 and 56 with the shroud sections 24 and 26, free end portions 66 and 68 (FIGS. 2 and 3) of the airfoil sections 54 and 56 are received in openings 70 and 72 formed in the outer and inner shroud sections. The openings 70 and 72 are shaped to abut the outer side surfaces of the airfoil sections which are received in the openings. Thus, the opening 70 in the outer shroud section 24 is partially defined by side surface 76 having a configuration corresponding to the configuration of the outer side surface 78 (FIG. 3) of the convex airfoil section 56. Similarly, the opening 72 has a side surface 82 (FIGS. 2 and 3) having a configuration corresponding to the configuration of an outer side surface 84 (FIG. 3) of the concave airfoil section 54. Therefore when leading and trailing edges 88 and 90 of the concave airfoil section 54 (see FIG. 2) have been aligned with leading and trailing edges 92 and 94 of the convex airfoil section 50, the free end portion 66 of the concave airfoil section can be inserted into the opening 72 and the free end portion 68 of the convex airfoil section can be inserted into the opening 70.

In order to locate the concave and convex airfoil sections 54 and 56 axially relative to each other, they are provided with locating or stop surfaces which engage the inner major side surfaces of the shroud sections 24 and 26. Thus, the free end portion of the concave airfoil section 54 is provided with a rectangular notch having a stop surface 98 (FIG. 2) which abuts the inner major side surface 36 of the inner shroud section 26 to limit axial movement of the concave airfoil section relative to the convex airfoil section. Similarly, the free end portion of the convex airfoil section 56 is provided with a rectangular notch having a stop surface 102 which engages the major inner side surface 30 of the outer shroud section 24 to limit axial movement of the convex airfoil section relative to the concave airfoil section.

Once the free end portions 66 and 68 of the airfoil sections 54 and 56 have been telescopically received in the openings 70 and 72 of the shroud sections 24 and 26, the free end portions of the airfoil sections are welded or brazed or mechanically fastened at 60 and 62 to the shroud sections. In addition, the leading edge 88 of the concave airfoil section 54 is welded, brazed or otherwise connected to the leading edge 92 of the convex airfoil section 56. Similarly, the trailing edge portion 90 of the concave airfoil section 54 is connected with the trailing edge 94 of the convex airfoil section. The resulting vane ring portion 20 includes a hollow metal airfoil 22 (FIG. 1) which is properly oriented relative to the shroud sections 24 and 26. Of course the vane portion 20 is connected with similar vane portions to form a complete vane ring.

In accordance with another feature of the present invention, the inner and outer parts 48 and 50 of the vane ring portion 20 are cast in separate mold cavities. Since the inner and outer parts 48 and 50 have a relatively heavy shroud sections and relatively thin vane sections, they can be cast in a mold having a single entrance passage through which molten metal enters the mold cavity. The use of a single passage to feed molten metal to the mold cavity eliminates the application of stresses to the relatively thin airfoil sections as they cool.

Figure 5:
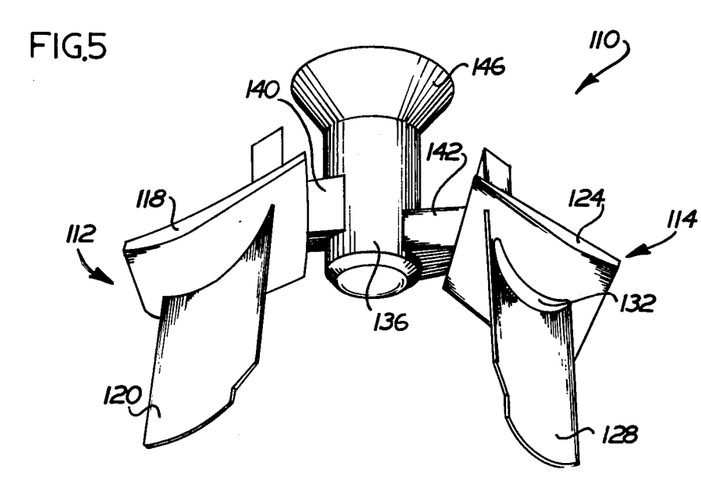
FIG. 5 is a pictorial illustration of a pattern utilized in forming of a mold for the shroud and airfoil sections of FIG. 2.

To form a mold for the inner and outer parts 48 and 50 of the vane ring portion 20, a pattern 110 is formed.

The pattern 110 includes a section 112 corresponding to the outer part 48 and a section 114 corresponding to the inner part 50. Thus, the outer part 112 of the pattern has a section 118 corresponding to the outer shroud section 24 and a relatively thin section 120 corresponding to the concave airfoil section 54. Similarly, the pattern section 114 includes a relatively heavy section 124 corresponding to the inner shroud section 26 and a relatively thin section 128 corresponding to the convex airfoil section 56. Although only an opening 132 in the pattern section 124 corresponding to the inner shroud section 26 is visible in FIG. 5, a similar opening is formed in the portion 118 of the pattern corresponding to the outer shroud section 24. The opening in the pattern portion 118 is concealed by the airfoil section 128 of the pattern.

To provide for the formation of passages to conduct molten metal, the pattern 110 also includes a relatively large cylindrical central section 136. Arms 140 and 142 radially extend outwardly to the sections 118 and 124 of the pattern. A frusto-conical section 146 is provided at the upper end of the pattern. The pattern is formed of a suitable wax material. However it is contemplated that the pattern could be formed of a plastic material such as polystyrene if desired.

In order to form a ceramic mold 150 (see FIG. 6), the pattern 110 is repetitively dipped in a slurry of liquid ceramic mold material. Although many different types of slurry could be utilized, one illustrative slurry contains fused silica, zircon, or other refractory materials in combination with binders. Chemical binders such as ethyl silicate, sodium silicate and colloidal silica can be utilized. In addition, the slurry may contain suitable film formers such as alginates to control viscosity and wetting agents to control flow characteristics and pattern wettability.

The pattern 110 is repetitively dipped in the liquid ceramic mold material to build up a coating of a desired thickness. Between each of the dipping steps, the pattern is at least partially dried. Once a coating of a desired thickness has been built up, the pattern is destroyed by heating the mold and the mold is fired at approximately 1900° F. to thoroughly cure the mold.

The mold 150 has a first cavity 154 (FIG. 6) in which the outer part 48 is cast and a second cavity 156 in which the inner part 50 is cast. The relatively large cylindrical part 136 of the pattern 110 forms a cylindrical downpour or main passage 158 which is connected with a frusto-conical pour cup 160. Molten metal from the pour cup 110 flows into the main passage 158. The metal flows from the main passage into branch passages 162 and 164 leading to the mold cavities 154 and 156. The branch passage 162 is connected with the relatively large upper portion of the mold cavity 154 which corresponds to the outer shroud section 24. The branch passage 164 is connected with the portion of the mold cavity corresponding to the inner shroud section 26. The molten metal flows from the relatively large upper portion of the cavities 154 and 156 to relatively thin portions of the cavities corresponding to the airfoil sections 54 and 56.

Figure 6:
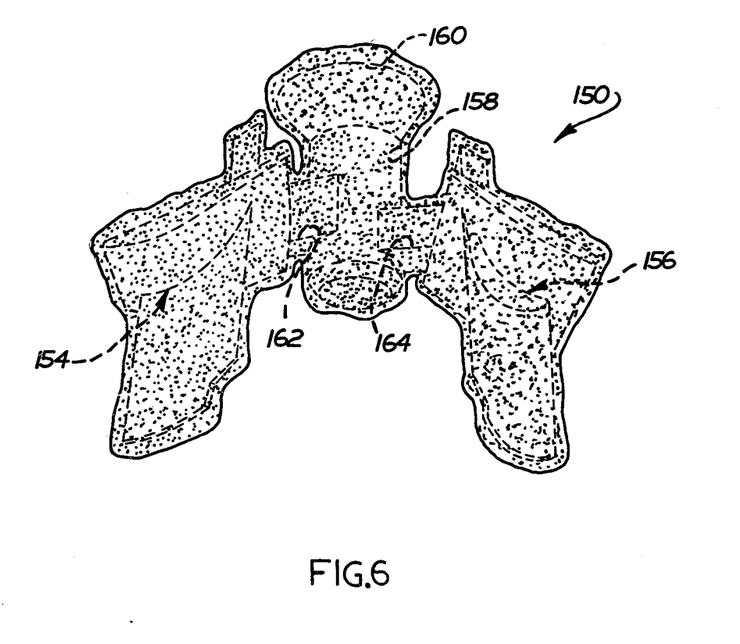
FIG. 6 is a pictorial illustration of a ceramic mold formed with the pattern of FIG. 5 and having cavities in which the shroud and airfoil sections of FIG. 2 are cast.

Since the mold cavities 154 and 156 have only relatively large upper sections corresponding to one of the shroud sections 24 or 26, two branch passages do not have to be used in association with each of the mold cavities. If each of the mold cavities was provided with a pair of relatively large sections, that is a section corresponding to the outer shroud section 24 and a section corresponding to the inner shroud section 26, the main passage 158 of the mold would have to be connected with the two relatively heavy sections of the mold cavity by a pair of branch passages. Due to uneven cooling and contraction of the relatively heavy body of metal in the main passage 158 and the relatively thin section of metal corresponding to the airfoil section, stresses would be applied to the airfoil section as the metal cooled.

In the embodiment of the invention illustrated in FIG. 1, the airfoil 22 has a leading end portion which is formed by interconnecting the two airfoil sections 54 and 56 in the manner previously explained. In the embodiment of the invention illustrated in FIG. 7, the airfoil is provided with a leading end section which is separate from main portions of the concave and convex airfoil sections. Since the embodiment of the invention illustrated in FIG. 7 is similar to the embodiment of the invention illustrated in FIG. 1, similar numerals will be utilized to designate similar components, the suffix letter "a" being associated with FIG. 7 in order to avoid confusion.

Figure 7:
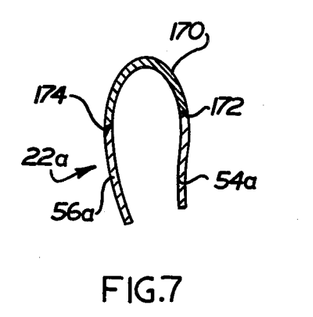
FIG. 7 is a fragmentary sectional view of a portion of an airfoil having a leading end section which is formed separately from side sections of the airfoil.

The airfoil 22a illustrated in FIG. 7 has a concave body section 54a and a convex body section 56a. The two body sections 54a and 56a of the airfoil 22a are connected with a leading end section 170 at a pair of welds 172 and 174 which extend axially across the blade. This construction enables the leading end section 170 of the airfoil to be formed of a material which is different from the material of the remainder of the airfoil.

Figure 8:
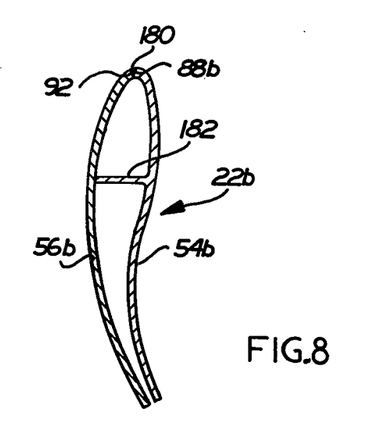
FIG. 8 is a sectional view of an embodiment of the invention in which a reinforcing wall is provided between the airfoil sections.

In the embodiment of the invention illustrated in FIG. 8, a reinforcing wall is provided between the convex and concave airfoil sections. Since the embodiment of the invention illustrated in FIG. 8 is generally similar to the embodiment of the invention illustrated in FIG. 1, similar numerals will be utilized to designate similar components, the suffix letter "b" being associated with the numerals designating components of the embodiment of the invention shown in FIG. 8 in order to avoid confusion.

The airfoil 22b includes a concave airfoil section 54b and a convex airfoil section 56b. These two airfoil sections are interconnected at the weld 180 between the leading edges 88b and 92b of the airfoil sections. In accordance with a feature of this embodiment of the invention, a reinforcing wall 182 is integrally formed with the airfoil section 54b and extends into abutting engagement with the airfoil section 56b to support the airfoil section 56b.

It is contemplated that airfoils constructed in accordance with the present invention will be utilized in environments where it will be desirable to cool the various sections of the airfoils. Accordingly, in the embodiment of the invention illustrated in FIGS. 9 and 10, a plurality of cooling tubes are provided in association with the airfoil sections. Since many of the components of the embodiment of the invention illustrated in FIGS. 9 and 10 are the same as the components of the embodiment of the invention illustrated in FIG. 1, similar numerals will be utilized to designate similar components, the suffix letter "c" being associated wtih FIGS. 9 and 10 in order to avoid confusion.

Figure 2:
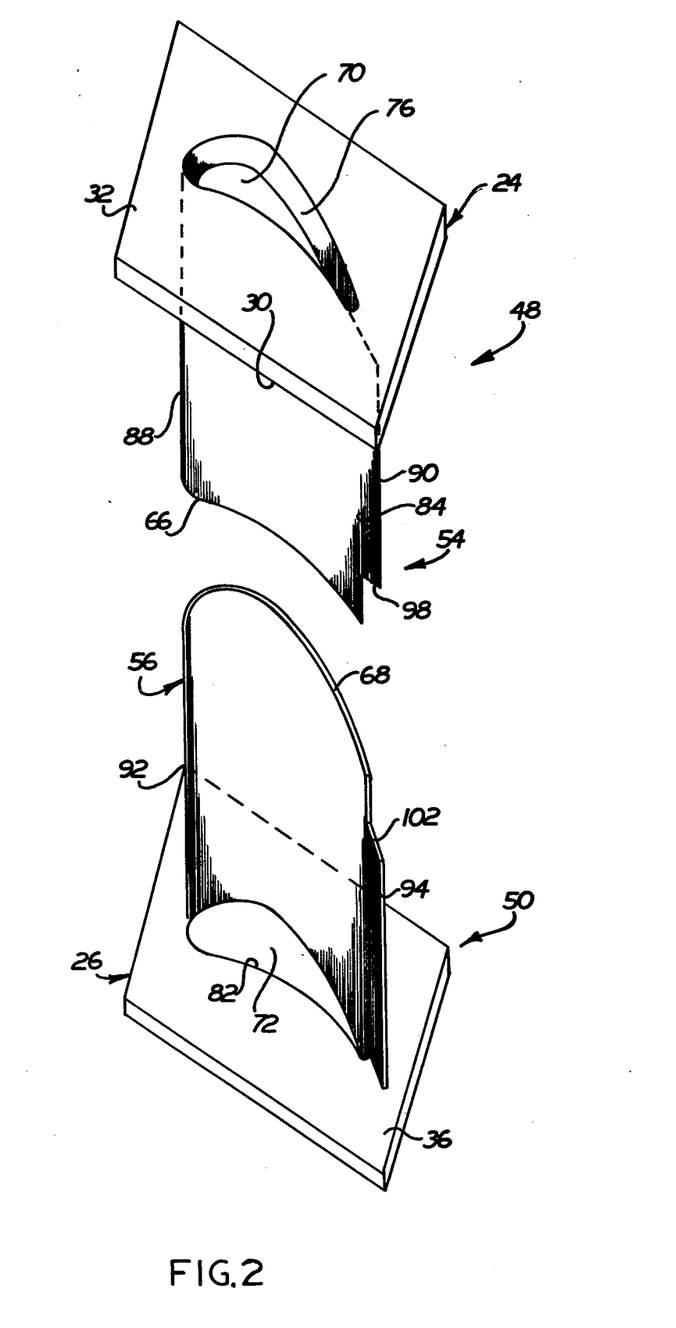
FIG. 2 is a pictorial illustration depicting an inner shroud section and an airfoil section spaced apart from an outer shroud section and another airfoil section before the airfoil and shroud sections have been interconnected.

The vane ring portion 20c includes an inner shroud section 26c from which an airfoil section 56c extends in the same manner as previously described in connection with the embodiment of the invention shown in FIG. 2. A second airfoil section 54c has an end portion which is received in an opening 72c formed in the inner shroud section 26c. The airfoil section 54c extends from an outer shroud section (not shown).

In accordance with a feature of this embodiment of the invention, before the airfoil section 56c is connected with the outer shroud section (not shown) and before the airfoil section 54c is connected with the inner shroud section 26c, a plurality of longitudinally extending cooling tubes 188 are mounted on the inner side surfaces 190 and 192 of the airfoil sections 54c and 56c. Each of the cylindrical cooling tubes 188 is disposed in a straight longitudinally extending groove 196 (see FIG. 10) formed in the associated airfoil section. The groove 196 has a semicircular bottom surface which extends from a radially outer surface of the outer shroud section to the radially inner surface of the inner shroud section. The cylindrical cooling tube 188 is brazed or otherwise connected with the inner side surface of the associated airfoil section. Since the inner side surfaces of the airfoil sections are exposed before they are interconnected, it is relatively easy to mount the cooling tubes along the inside surface of the airfoil sections.

Figure 9:
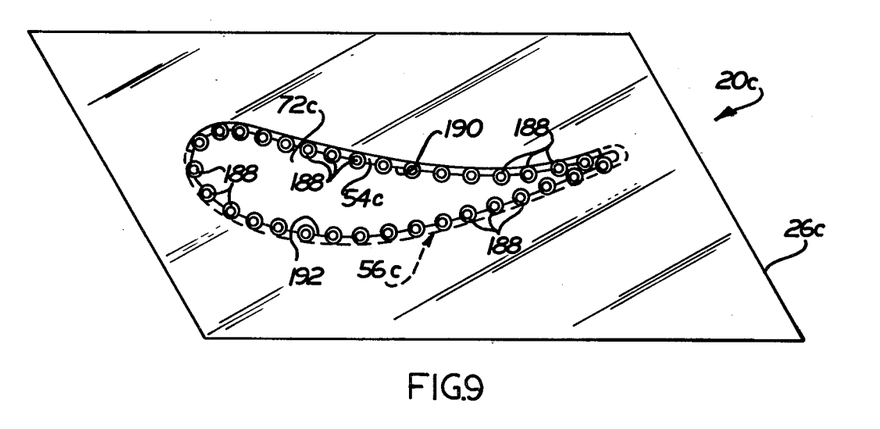
FIG. 9 is an end view of interconnected shroud and airfoil sections of an embodiment of the invention in which cooling tubes are provided along inner surfaces of the airfoil sections.
Figure 10:
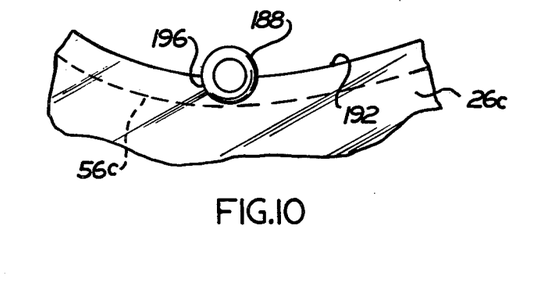
FIG. 10 is an enlarged fragmentary view illustrating the manner in which one of the cooling tubes of FIG. 9 is connected with an airfoil section.

In the embodiment of the invention illustrated in FIGS. 9 and 10, the cooling tubes 188 extend through the inner and outer shroud sections. It is believed that some difficulty may be encountered in forming the grooves 196 in the inner surfaces of the airfoil sections where they extend through the openings in the shrouds. This problem is eliminated with the embodiment of the invention illustrated in FIG. 11. In this embodiment of the invention the shrouds are split along the common plane with the airfoil to provide access to the inner surfaces of the airfoil sections where they extend into the shrouds. Since the embodiment of the invention illustrated in FIG. 11 is generally similar to the embodiment of the invention illustrated in FIGS. 1–4, similar numerals will be utilized to designate similar components, the suffix letter "d" being associated with the components of FIG. 11 in order to avoid confusion.

Figure 11:
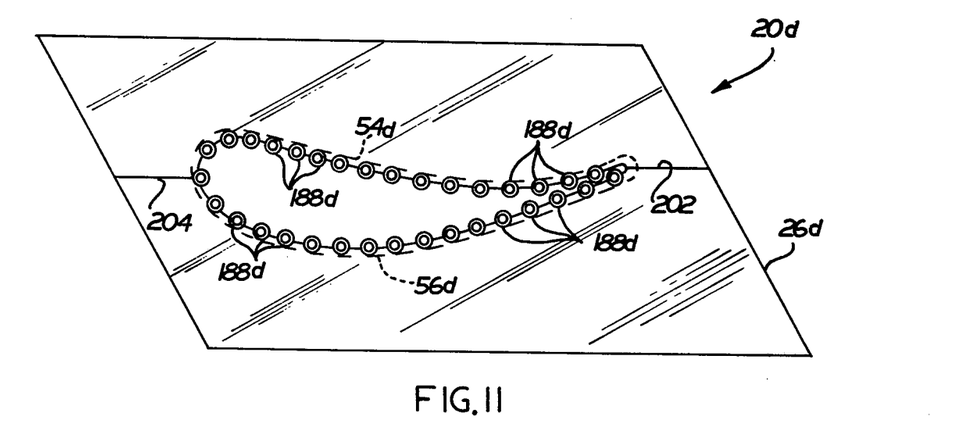
FIG. 11 is an end view of another embodiment of the invention in which cooling tubes are disposed along the inside surfaces of airfoil sections.

The vane ring portion 20d of FIG. 11 has an inner shroud 26d and an outer shroud (not shown) which are split along the lines 202–204. The airfoil is split along the same line to form section 54d and 56d. This results in the vane ring portion 20d being formed in two half sections. One of the ways in which this embodiment of the invention differs from the embodiment of the invention illustrated in FIGS. 1–4 is that a portion of the inner shroud and a portion of the outer shroud are integrally cast with each of the airfoil sections. Thus, a lower portion (as viewed in FIG. 11) of the inner shroud 26d and a lower portion of the outer shroud (not shown) integrally formed with the airfoil section 56d. Similarly, the upper portion of the shroud 26d and the upper portion of the outer shroud (not shown) is integrally formed with the airfoil section 54d. Although this may contribute to casting difficulties, it does facilitate the forming of grooves for cooling tubes 188d on the inside surfaces of the airfoil sections.

In the embodiment of the invention illustrated in FIGS. 9–11, cylindrical cooling tubes 188 are mounted in semicircular grooves formed in the inside of the airfoil sections to provide passages for cooling fluid. In the embodiment of the invention illustrated in FIG. 12, a longitudinally extending conduit wall is connected with the inside of the airfoil section and cooperates with a groove in the airfoil section to define a passage for cooling fluid. Since the embodiment of the invention illustrated in FIG. 12 is generally similar to the embodiment of the invention illustrated in FIGS. 9–11, similar numerals will be utilized to designate similar components, the suffix letter "e" being associated with FIG. 12 in order to avoid confusion.

Figure 12:
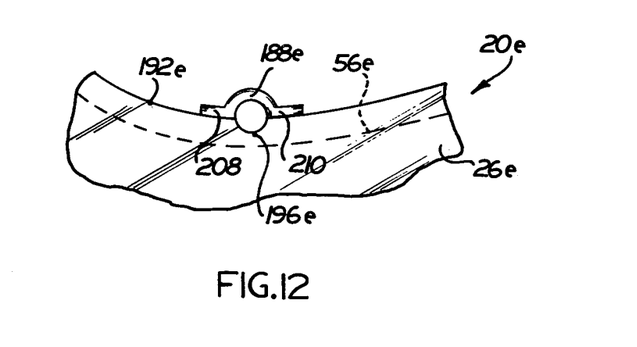
FIG. 12 is an enlarged fragmentary sectional view, generally similar to FIG. 10, illustrating an embodiment of the invention in which a longitudinally extending wall cooperates with a groove in the inside surface of an airfoil section to form a cooling fluid conduit.

A vane ring portion 20e having an inner shroud section 26e and a convex blade section 56e is shown in FIG. 12. The convex blade section 56e is provided with longitudinally extending grooves 196e which extend along the inside surface of the airfoil between the inner and outer shrouds. The straight groove 196e has a semicircular bottom surface which cooperates with a longitudinally extending wall section 188e to define a longitudinally extending passage for cooling fluid. The wall section 188e is brazed or otherwise connected to the inner side surface 192e of the airfoil section 56e.

Although the conduit wall 188e could be formed with a semicircular configuration, the wall is advantageously formed with outwardly projecting side sections 208, 210 which are connected with the inner surface 192e of the airfoil section 56e. It should be understood that although the wall section 188e has been illustrated in FIG. 12 as having a generally arcuate configuration, it is contemplated that the wall section could have any desired cross sectional configuration. For example, the wall section could be made out of a flat strip of metal if desired.

In view of the foregoing description it is apparent that the present invention provides a method of forming inner and outer shroud sections 24 and 26 with an airfoil 22 extending between them. A first section 56 of the airfoil 22 is formed with a section 26 of the inner shroud. A second airfoil section 54 is formed with a section 24 of the outer shroud. The two airfoil sections 54 and 56 are then interconnected to complete the airfoil 22 and to interconnect the inner and outer shroud sections 24 and 26.

To facilitate interconnecting the airfoil and shroud section, each of the shroud sections 24 and 26 is formed with an opening 70 or 72 adjacent to a base of the associated airfoil section. A free end 66 or 68 of the other airfoil section is inserted into the opening and connected with the shroud section.

By forming the inner and outer shroud sections 54 and 56 separately from each other, casting of the shroud sections is facilitated. When the inner and outer shroud sections are cast in association with a single airfoil, the mold must have a down pour pole with two runners, that is a runner for each of the two shroud sections. When the metal in the down pour pole cools, it contracts to a greater extent than the relatively thin airfoil with the resulting application of stresses to the airfoil. By casting a single shroud section in association with an airfoil section, the stress applied to the airfoil section when the metal cools is reduced.

It is believed that the present method of forming the airfoil and shroud sections will be particularly advantageous when it is desired to provide a hollow airfoil (FIGS. 9 and 11) with cooling tubes. The cooling tubes 188 can be connected to the airfoil sections before they are interconnected to thereby facilitate attachment of the cooling tubes to the inside surfaces of the airfoil sections. In one embodiment of the invention (FIG. 11), attachment of the cooling tubes to the inner surfaces of the airfoil sections is expedited by forming a portion of both the inner and outer shroud in association with each of the airfoil sections.

Having described specific preferred embodiments of the invention, the following is claimed.

1. A method of forming inner and outer shroud sections with an airfoil extending between them, said method comprising the steps of forming a first airfoil section having a free end portion and an opposite end portion connected with the inner shroud section, said step of forming the first airfoil section and inner shroud section includes the step of forming an opening in the inner shroud section, forming a second airfoil section and an outer shroud section with the second airfoil section having a free end portion and an opposite end portion connected with the outer shroud section, said step of forming the second airfoil section and outer shroud section including the step of forming an opening in the outer shroud section, connecting the free end portion of the first airfoil section to the outer shroud section, said step of connecting the free end portion of the first airfoil section to the outer shroud section including the step of positioning the free end portion of the first airfoil section relative to the outer shroud section by inserting at least part of the free end portion of the first airfoil section into the opening in the outer shroud section, and connecting the free end portion of the second airfoil section to the inner shroud section, said step of connecting the free end portion of the second airfoil section to the inner shroud section including the step of positioning the free end portion of the second airfoil section relative to the inner shroud section by inserting at least part of the free end portion of the second airfoil section into the opening in the inner shroud section.

2. A method as set forth in claim 1 further including the step of forming a leading end section of the airfoil separately from the first and second airfoil sections, and connecting the leading end section of the airfoil with the first and second airfoil sections and with the inner and outer shroud sections.

3. A method as set forth in claim 1 further including the step of providing a reinforcing wall section extending from one of the airfoil sections, said steps of connecting the free end portions of the first and second airfoil sections with the inner and outer shroud sections including positioning an end of the reinforcing wall section in abutting engagement with the other one of the airfoil sections.

4. A method as set forth in claim 1 further including the step of providing a plurality of cooling tubes along an inner side surface of one of the airfoil sections before performing said steps of connecting the free end portions of the first and second airfoil sections with the inner and outer shroud sections.

5. A method as set forth in claim 1 wherein said step of inserting the free end portion of the second airfoil section into the opening in the inner shroud section includes the step of limiting the extent to which the free end portion of the second airfoil section is inserted into the opening by abuttingly engaging a side surface of the inner shroud section with part of the free end portion of the second airfoil section, said step of inserting the free end portion of the first airfoil section into the opening in the outer shroud section includes the step of limiting the extent to which the free end portion of the first airfoil section is inserted into the opening by abuttingly engaging a side surface of the outer shroud section with part of the free end portion of the first airfoil section.

6. A method as set forth in claim 1 wherein said step of forming a first airfoil section and an inner shroud section includes the step of providing a mold cavity having a first portion with a configuration corresponding to the configuration of the first airfoil section and a second portion with a configuration corresponding to the configuration of the inner shroud section, and flowing molten metal into the first portion of the cavity only from the second portion of the mold cavity.

7. A method as set forth in claim 1 wherein said step of forming a second airfoil section and an outer shroud section includes the step of providing a mold cavity having a first portion with a configuration corresponding to the configuration of the second airfoil section and a second portion with a configuration corresponding to the configuration of the outer shroud section, and flowing molten metal into the first portion of the mold cavity only from the second portion of the mold cavity.

8. A method as set forth in claim 1 further including the step of connecting a leading edge portion of the first airfoil section with a leading edge portion of the second airfoil section.

9. A method as set forth in claim 1 further including the step of connecting a trailing edge portion of the first airfoil section with a trailing edge portion of the second airfoil section.

10. A method as set forth in claim 1 wherein said step of forming the first airfoil section and the inner shroud section includes the step of forming a plurality of grooves in an inner side of the first airfoil section and connecting a plurality of longitudinally extending conduit walls with the inner side of the first airfoil section to provide passages for conducting coolant along the inner side of the first airfoil section.

11. A method as set forth in claim 10 wherein said step of connecting a plurality of longitudinally extending conduit walls with the first airfoil section includes the step of positioning tubular conduit walls in the grooves and connecting the tubular conduit walls with the first airfoil section.

12. A method as set forth in claim 10 wherein said step of connecting a plurality of longitudinally extending conduit walls with the first airfoil section includes the step of positioning the longitudinally extending conduit walls over the grooves and connecting the conduit walls with the first airfoil section to form a plurality of coolant passages between bottom surfaces of the grooves and the longitudinally extending conduit walls.

13. A method as set forth in claim 1 wherein said step of forming the second airfoil section and the outer shroud section includes the step of forming a plurality of grooves in an inner side of the second airfoil section and connecting a plurality of longitudinally extending conduit walls with the inner side of the second airfoil section to provide passages for conducting coolant along the inner side of the second airfoil section.

14. A method as set forth in claim 13 wherein said step of connecting a plurality of longitudinally extending conduit walls with the second airfoil section includes the step of positioning tubular conduit walls in the grooves and connecting the tubular conduit walls with the second airfoil section.

15. A method as set forth in claim 13 wherein said step of connecting a plurality of longitudinally extending conduit walls with the second airfoil section includes the step of positioning the longitudinally extending conduit walls over the grooves and connecting the conduit walls with the second airfoil section to form a plurality of coolant passages between bottom surfaces of the grooves and the longitudinally extending conduit walls.

16. A method as set forth in claim 1 wherein said step of forming an opening in the inner shroud section includes the step of forming an opening which extends between major side surfaces of the inner shroud section and is disposed adjacent to a curved major side surface of said first airfoil section, said step of forming an opening in the outer shroud section includes the step of forming an opening which extends between major side surfaces of the outer shroud section and is disposed adjacent to a curved major side surface of said second airfoil section.

17. A method of forming inner and outer shroud sections with an airfoil extending between them, said method comprising the steps of forming a first airfoil section and an inner shroud section with the first airfoil section having a free end portion, an opposite end portion connected with the inner shroud section, and an edge portion extending between said end portions, said step of forming a first airfoil section and an inner shroud section including the steps of forming a locating surface on the inner shroud section and forming a locating surface on the free end portion of said first airfoil section, forming a second airfoil section and an outer shroud section with the second airfoil section having a free end portion, an opposite end portion connected with the outer shroud section, and an edge portion extending between said end portions of said second airfoil section, said step of forming a second airfoil section and an outer shroud section including the steps of forming a locating surface on the outer shroud section and forming a locating surface on the free end portion of said second airfoil section, connecting the free end portion of the first airfoil section to the outer shroud section, said step of connecting the free end portion of the first airfoil section to the outer shroud section includes the step of locating the first airfoil section relative to the edge portion of the second airfoil section by positioning the locating surface on the free end portion of the first airfoil section in abutting engagement with the locating surface on the outer shroud section, and connecting the free end portion of the second airfoil section to the inner shroud section, said step of connecting the free end portion of the second airfoil section to the inner shroud section includes the step of locating the second airfoil section relative to the edge portion of the first airfoil section by positioning the locating surface on the free end portion of the second airfoil section in abutting engagement with the locating surface on the inner shroud section.

18. A method as set forth in claim 17 wherein said step of connecting the free end portion of the first airfoil section to the outer shroud section further includes the step of welding the free end portion of the first airfoil section directly to the outer shroud section after positioning the locating surface on the free end portion of the first airfoil section in abutting engagement with the locating surface on the outer shroud section, said step of connecting the free end portion of the second airfoil section to the inner shroud section further includes the step of welding the free end portion of the second airfoil section directly to the inner shroud section after positioning the locating surface on the free end portion of the second airfoil section in abutting engagement with the locating surface on the inner shroud section.

19. A method as set forth in claim 17 further including the step of providing a plurality of cooling tubes along an inner side surface of one of the airfoil sections before performing said steps of connecting the free end portions of the first and second airfoil sections with the inner and outer shroud sections.

20. A method as set forth in claim 17 wherein said step of forming the first airfoil section and inner shroud section includes the step of forming an opening in the inner shroud section, said step of connecting the free end portion of the second airfoil section to the inner shroud section including the step of inserting at least part of the free end portion of the second airfoil section into the opening in the inner shroud section, said step of forming the second airfoil section and outer shroud section including the step of forming an opening in the outer shroud section, said step of connecting the free end portion of the first airfoil section to the outer shroud section including the step of inserting at least part of the free end portion of the first airfoil section into the opening in the outer shroud section.

21. A method as set forth in claim 17 wherein said step of forming a first airfoil section and an inner shroud section includes the step of providing a first mold cavity having a first portion with a configuration corresponding to the configuration of the first airfoil section and a second portion with a configuration corresponding to the configuration of the inner shroud section, said step of forming a second airfoil section and an outer shroud section including the step of providing a second mold cavity which is spaced apart from the first mold cavity and has a first portion with a configuration corresponding to the configuration of the second airfoil section and a second portion with a configuration corresponding to the configuration of the outer shroud section, said steps of forming the first and second airfoil sections and the inner and outer shroud sections including the steps of providing a main passage for receiving molten metal, a first branch passage to conduct molten metal to the first mold cavity, a second branch passage to conduct molten metal to the second mold cavity, and contemporaneously flowing molten metal from the main passage into both of the mold cavities through only the first and second branch passages to fill the first and second mold cavities with molten metal.

22. A method of forming an airfoil, said method comprising the steps of forming a first airfoil section and a first shroud section with the first airfoil section having a free end portion, an opposite end portion connected with the first shroud section, said first airfoil section having a pair of longitudinally extending edges, said step of forming a first airfoil section includes the step of forming a plurality of grooves in an inner side of the first airfoil section and connecting a plurality of longitudinally extending conduit walls with the inner side of the first airfoil section to provide passages for conducting coolant along the inner side of the first airfoil section, said step of connecting a plurality of longitudinally extending conduit walls with the first airfoil section includes the step of positioning tubular conduit walls in the grooves and connecting the tubular conduit walls with the first airfoil section, forming a second airfoil section having a pair of longitudinally extending edges and a second shroud section, positioning the longitudinally extending edges of the first and second airfoil sections adjacent to each other after performing said step of connecting tubular conduit walls with the first airfoil section, and connecting the first and second airfoil sections together along their longitudinally extending edges so that forces can be transmitted between said airfoil sections independently of said tubular conduit walls.

23. A method as set forth in claim 22 wherein said step of forming a second airfoil section includes the step of forming a plurality of grooves in an inner side of the second airfoil section and connecting a plurality of longitudinally extending conduit walls with the inner side of the second airfoil section to provide passages for conducting coolant along the inner side of the second airfoil section, said step of connecting a plurality of longitudinally extending conduit walls with the second airfoil section includes the step of positioning tubular conduit walls in the grooves and connecting the tubular conduit walls with the second airfoil section.

24. A method of forming an airfoil, said method comprising the steps of forming a first airfoil section and a first shroud section with the first airfoil section having a free end portion, an opposite end portion connected with the first shroud section, said first airfoil section having a pair of longitudinally extending edges, said step of forming a first airfoil section includes the step of forming a plurality of grooves in an inner side of the first airfoil section and connecting a plurality of longitudinally extending conduit walls with the inner side of the first airfoil section to provide passages for conducting coolant along the inner side of the first airfoil section, said step of connecting a plurality of longitudinally extending conduit walls with the first airfoil section includes the step of positioning the longitudinally extending conduit walls over the grooves and connecting the conduit walls with the first airfoil section to form a plurality of coolant passages between bottom surfaces of the grooves and the longitudinally extending conduit walls, forming a second airfoil section having a pair of longitudinally extending edges and a second shroud section, positioning the longitudinally extending edges of the first and second airfoil sections adjacent to each other after performing said step of connecting conduit walls with the first airfoil section to form a plurality of coolant passages, and thereafter connecting the first and second airfoil sections together along their longitudinally extending edges so that forces can be transmitted between said airfoil sections independently of said conduit walls.

25. A method as set forth in claim 24 wherein said step of forming a second airfoil section includes the step of forming a plurality of grooves in an inner side of the second airfoil section and connecting a plurality of longitudinally extending conduit walls with the inner side of the second airfoil section to provide passages for conducting coolant along the inner side of the second airfoil section, said step of connecting a plurality of longitudinally extending conduit walls with the second airfoil section includes the step of positioning the longitudinally extending conduit walls over the grooves and connecting the conduit walls with the second airfoil section to form a plurality of coolant passages between bottom surfaces of the grooves and the longitudinally extending conduit walls.

* * * * *